(12) United States Patent
Dubey

(10) Patent No.: US 7,846,536 B2
(45) Date of Patent: Dec. 7, 2010

(54) BUILDING PANELS WITH AESTHETIC EDGES

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 11/014,302

(22) Filed: Dec. 16, 2004

(65) Prior Publication Data

US 2006/0134371 A1    Jun. 22, 2006

(51) Int. Cl.
*B32B 23/02* (2006.01)

(52) U.S. Cl. .................. 428/192; 428/67; 428/195.1; 428/312.4; 428/251; 442/118; 442/79; 442/36; 442/129; 52/601; 52/811; 52/612

(58) Field of Classification Search .............. 428/312.4, 428/192, 67, 195.1, 251; 52/811, 612, 601; 442/129, 36, 79, 118
See application file for complete search history.

(56) References Cited

U.S. PATENT DOCUMENTS

| | | |
|---|---|---|
| 1,772,483 A | 8/1930 | Griswold |
| 1,787,163 A | 12/1930 | New |
| 1,805,840 A | 5/1931 | New |
| 4,041,203 A | 8/1977 | Brock et al. |
| 4,463,043 A | 7/1984 | Reeves et al. |
| 4,647,496 A * | 3/1987 | Lehnert et al. ............... 442/386 |
| 4,916,004 A | 4/1990 | Ensminger et al. |
| 5,169,706 A | 12/1992 | Collier, IV et al. |
| 5,221,386 A * | 6/1993 | Ensminger et al. ............ 156/40 |
| 5,644,880 A | 7/1997 | Lehnert et al. |
| 5,704,179 A | 1/1998 | Lehnert et al. |
| 5,791,109 A | 8/1998 | Lehnert et al. |
| 6,054,205 A * | 4/2000 | Newman et al. ............ 428/221 |
| 6,187,409 B1 | 2/2001 | Mathieu |
| 6,485,821 B1 | 11/2002 | Bruce et al. |
| 6,488,792 B2 | 12/2002 | Mathieu |
| 6,524,679 B2 * | 2/2003 | Hauber et al. .................. 428/68 |
| 6,682,617 B2 | 1/2004 | Gregg et al. |
| 6,787,486 B1 * | 9/2004 | Gregg et al. ................... 442/42 |
| 7,049,251 B2 * | 5/2006 | Porter .......................... 442/79 |
| 2004/0142618 A1 | 7/2004 | Porter |
| 2004/0214489 A1 * | 10/2004 | Porter ......................... 442/36 |
| 2004/0266304 A1 * | 12/2004 | Jaffee ......................... 442/386 |
| 2005/0009428 A1 * | 1/2005 | Porter et al. ................. 442/129 |
| 2005/0255308 A1 * | 11/2005 | Gregg et al. ............. 428/312.4 |

* cited by examiner

*Primary Examiner*—Bruce H. Hess
*Assistant Examiner*—Tamra L. Amakwe
(74) *Attorney, Agent, or Firm*—Greer, Burns & Crain, Ltd.; David F. Janci, Esq.; Philip T. Petti, Esq.

(57) ABSTRACT

A building composite panel including at least one longitudinal edge is made of a core of hydraulic cement and a multi-ply edge facing material covering and attached to at least one of the longitudinal edges. The facing material includes at least a first ply configured for attachment to the core as it sets and at least a second, water-impermeable ply.

17 Claims, 1 Drawing Sheet

BUILDING PANELS WITH AESTHETIC EDGES

FIELD OF THE INVENTION

This invention relates to composite building panels. More specifically, it relates to building panels having aesthetically pleasing edges.

BACKGROUND OF THE INVENTION

Composite building panels such as drywall panels or cement board are frequently used to enhance construction productivity by reducing time spent waiting for hydraulic materials to set and dry. Conventional drywall panels, which are primarily made of gypsum, are particularly useful for interior construction of walls and ceilings. Gypsum panels are also available with water resistant additives that allow them to be used in damp or humid areas like bathrooms or basements. Precast cement board is useful where strength or stability is desired, such as an underlayment for ceramic tile. A wide variety of these building panels are available that utilize a variety of compositions for specific locations or applications.

Many building panels are constructed with facing or reinforcing materials on one or more faces of the panel. Facing materials are commonly used to alter one or more physical properties of the panel. In the case of drywall, the material on the face exposed after installation provides a smooth surface that is receptive of decorative coatings such as paint or wallpaper. Reinforcing of the edge with facings provides strength where panels are nailed into place. Cement board panels utilize facings that hold fast to adhesives, both to hold the panel in place and to tightly bond the panel to decorative finishes such as flooring tiles.

Less frequently, facing materials have been used to cover the edges of a composite building panel. In U.S. Pat. No. 1,787,163, fabric is used to reinforce the longitudinal edge of the panel to improve nailing durability and other structural qualities of the edge. The use of facings also helps to protect the panel from gouges, chipping, nicks and other damage that may occur during shipping, stocking or installation of the panels. The edge strip fabric was described as being sufficiently porous to allow the plaster to penetrate through it.

U.S. Pat. Nos. 6,187,409 and 6,488,792 reveal the use of a U-shaped edge strip comprising reinforcing fibers. The strip has permeable portions that adhere to the top and bottom surface of the panel. Along the longitudinal face there is an impermeable portion that does not adhere to the cementitious core. In practice, however, it is very difficult to align the impermeable portion exactly with the longitudinal face. This results in panels where the impermeable portion extends over the top or bottom edge of the longitudinal face, leaving the opposing edge on the longitudinal face covered with the water permeable covering. As the slurry permeates the covering, it comes through to the surface of the longitudinal face producing a non-uniform and blotchy look along the longitudinal face when the finished panels are stacked for storage. Where the slurry has permeated the edge strip and dried, the surface is rough and uneven, resulting in an edge that is uncomfortable to grasp with hands.

SUMMARY OF THE INVENTION

These, and other problems readily identified by those skilled in the art, are solved by the composite building panel of the present invention. A building composite panel including at least one longitudinal edge is made of a core of hydraulic cement and a multi-ply edge facing material covering and attached to at least one of the longitudinal edges. The facing material includes at least a first ply configured for attachment to the core as it sets and at least a second, water-impermeable ply. A preferred facing material is a three-ply laminate that includes a meltblown lamina sandwiched between two spunbond laminae.

Use of a multi-ply edge facing provides for both secure adherence of the facing to the building panel and prevents liquid slurry from penetrating the facing before it sets. Because the first ply is configured to become embedded into the slurry as it sets, no additional steps, such as application of an adhesive, are required to attach it to the panel, other than to allow the liquid slurry to permeate the first ply.

However, because at least a second ply is water-impermeable, the slurry does not penetrate through the entire thickness of the facing. This keeps the outside of the facing clean, with no spots of hydraulic material. The resulting edge is clean, uniform and aesthetically pleasing to the eye. It also is free of uneven or hard spots of concrete so as to be safer and more comfortable to those who grip the edges to move the panels.

DETAILED DESCRIPTION OF THE DRAWINGS

DETAILED DESCRIPTION OF THE INVENTION

Figure 1:
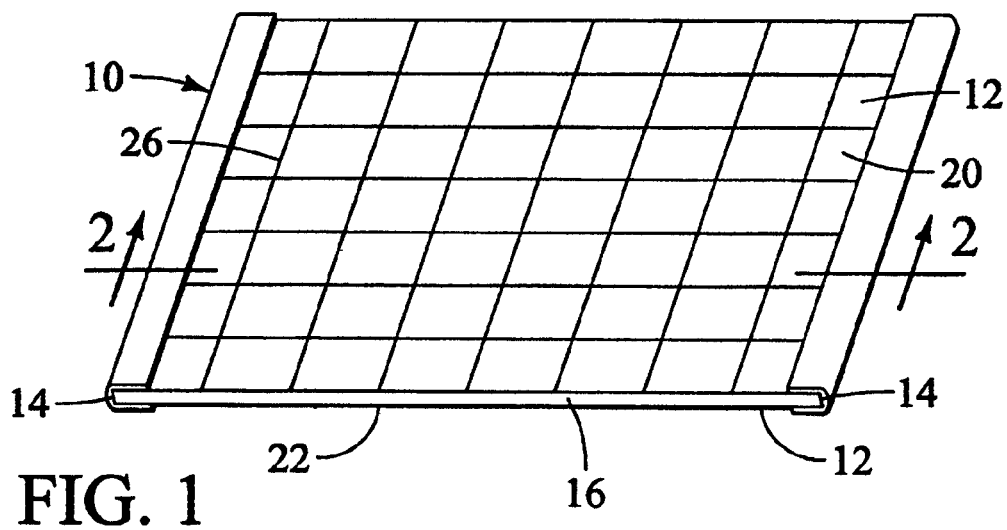
FIG. 1 is a building panel of the present invention.

Referring to FIG. 1, a building composite panel, generally 10, has a pair of opposing major faces, generally 12, at least one longitudinal edge face 14 and a core 16 of set hydraulic material.

Each panel 10 has a core 16 of hydraulic material that reacts when added to water to form a set matrix of interlocking crystals. Hydraulic materials preferred for use as core 16 material, include Portland cement, silica cement, fly ash cements, pozzolans, calcined gypsum, other cements and mixtures thereof. Other embodiments of this panel 10 use calcined gypsum as the core 16 material to make gypsum boards for interior use. Panels 10 using gypsum cements, that are a combination of calcined gypsum and a hydraulic cement, are advantageously used for flooring or for exterior use. These are but examples of building panels 10 that can be used advantageously with the present invention and are not intended to limit the invention in any way. The size of the panels 10 varies with the application with which the panel 10 is used, and any suitable size is useful with the panel of the instant invention.

Any core 16 additives known for use in building panels are useful in the present panels 10. Common additives include foaming agents, defoamers, set modifying agents, thickeners, colorants, rheology modifiers and the like. Choice of additives will depend on the core 16 composition and the intended application for the finished panels.

The panel 10 includes at least one and preferably two of the longitudinal edge faces 14. Preferably, the panels 10 are manufactured in a continuous fashion and cut to a desired size. Where there are two longitudinal edge faces 14 oriented as in FIG. 2, they are generally parallel to each other on opposing sides of the panel 10, but are not necessarily so. The longitudinal edge face 14 has a height that is the thickness of the panel 10 and a width equal to the length of the panel on the side that forms the longitudinal edge face.

Figure 2:
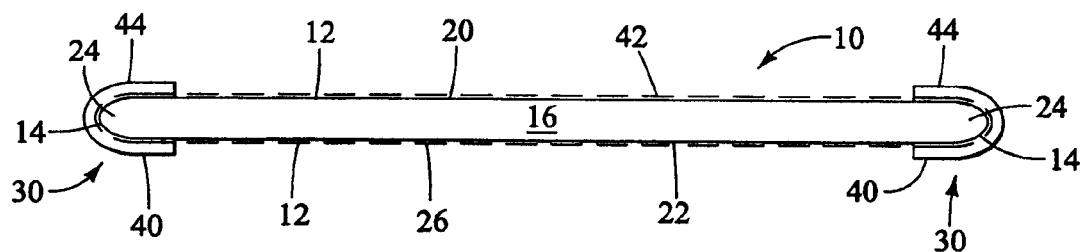
FIG. 2 is a cross section of the building panel taken along the line 2-2 of FIG. 1 and in the direction indicated.

Referring now to FIGS. 1 and 2, preferably, the building panel 10 has multiple additional faces, including a pair of the major faces 12, referred to as a top face 20 and a bottom face 22. Optionally, there is a nailing portion 24 of the panel 10 that has reduced core 16 thickness to accommodate nail heads and nail coverings while maintaining a smooth surface. One or more of the major faces 12 optionally has a first reinforcing material 26. Choice of a first reinforcing material 26 depends upon the construction of the hydraulic core 16. Cement based boards 10 generally utilize a fabric, mesh or scrim as the first reinforcing material 26 on the at least one major face 12 of the panel. Gypsum panels 10 are often covered with a multi-ply paper facing. Plastic sheets and films have also been used to as the first reinforcing material 26 one or more of the major faces 12. Choice of a reinforcing material 26 generally is determined by the intended use of the panel 10.

Figure 3:
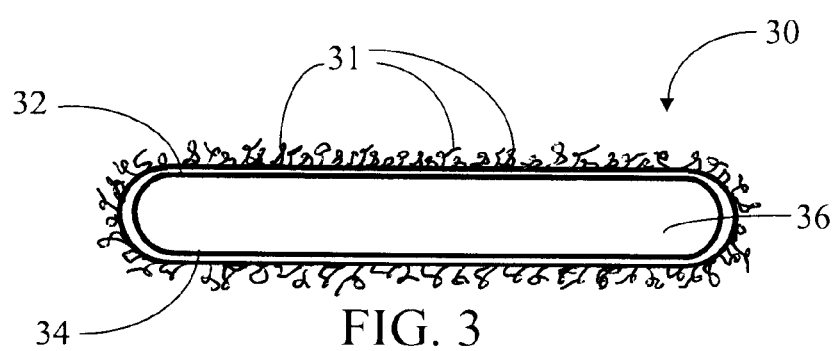
FIG. 3 is a cross section of the preferred SMS Laminate edge facing material.

Referring to FIGS. 2 and 3, an edge facing, generally 30, is preferably applied to the longitudinal edges 14 that are formed continuously and are parallel to the direction of movement as the panels are formed. The edge facing 30 is flexible enough to wrap around the longitudinal edge face 14 of the panel 10. It also has at least two plies to give it the desired properties. A first ply 32 is configured to become attached to the core 16. Preferably, it is applied to the core 16 slurry and is water permeable so that it is easily bonded to the core by embedding fibers from the first ply 32 in the core slurry. The term "water-permeable" means that the ply is permeated by water or water based systems, such as a gypsum slurry. Preferably, the first ply 32 is a fabric that is woven or non-woven, materials that are either natural or synthetic. More preferably, the first ply 32 is a synthetic, non-woven fabric. Many synthetic, non-woven fabrics 32 are known in the art that are made by different processes, and they are equally suitable for use as the edge facing 30.

One preferred example of a first ply 32 is a lamina of synthetic, non-woven fabric, such as a spunbond fabric. A molten polymer is extruded and spun into long, thin filaments that become entangled and bond to each other while the filaments are still tacky. The spunbond lamina 32 is light weight and water permeable. It has a fabric-like texture and is soft to the touch. When applied to the core 16 slurry, the slurry penetrates the spunbond lamina 32 and the fibers 31 become embedded in the matrix structure as the hydraulic material sets. This action bonds the edge facing 30 firmly to the panel 10. Thermoplastic polymers, including polypropylene, polyethylene, polyamides and polyesters, are preferred materials for any of the plies of the edge facing 30.

Although only a single spunbond lamina is required, it is preferable to use a spunbond lamina on each of the first ply 32 and an optional third ply 34 of the edge facing 30. The spunbond lamina of the first ply 32 is optionally the same or different composition from the second spunbond lamina of the third ply. When both sides of the edge facing 30 are the same, the edge facing is reversible and is more convenient to apply since either side is equally suitable for application to the longitudinal edge 14 of the panel 10. The panel 10 also has an exterior surface that is aesthetically pleasing to the eye and comfortable to grip when carrying the panel.

A second ply 36 is a substantially water impermeable ply that is bonded to the first ply 32. Suitable materials for the second ply 36 include woven or non-woven materials that are either natural or synthetic. This second ply 36 is preferably a meltblown lamina. Compared to the spunbond lamina 32, the meltblown lamina has short fibers (not shown) that are relatively short and thick. They pack together to form a ply that is denser and much more difficult for water-based systems to penetrate. "Substantially water-impenetrable" means that at relatively low hydrostatic pressure water-based systems do not pass through the material, however when relatively high hydrostatic pressure is applied, water-based systems can push between the short fibers, penetrating the ply. However, at atmospheric conditions where the edge wrap 30 is applied and the core 16 material sets, the meltblown lamina 36 prevents the slurry from penetrating through the edge facing material.

A preferred edge facing 30 material for at least one of the longitudinal faces 14 of a cementitious panel 10 is a three-ply laminate, SMS Laminate, made by Kimberly-Clark of Roswell, Ga. SMS Laminate is especially preferred because it includes a meltblown lamina 36 that is sandwiched between two spunbond laminae 32, 34. Details of this preferred spunbond/meltblown/spunbond (SMS) laminate are disclosed in U.S. Pat. No. 4,041,203 to Brock et al. and U.S. Pat. No. 5,169,706 to Collier, et al., each of which is hereby fully incorporated by reference.

The three plies 32, 34, 36 may be made individually, collected in rolls and combined in a separate bonding step. Alternately, the SMS Laminate is made by sequentially depositing the first spunbond lamina 32, then the meltblown lamina 36 and then another spunbond lamina 34. Prior to extrusion, the polymer is heated above the glass transition temperature. Fibers are extruded from the soft polymer and remain soft and tacky for a short time after extrusion. The laminae 32, 34, 36 are formed and calendared while the fibers are still tacky, bonding the laminae together without the addition of adhesives. Although the use of adhesives is not detrimental to the finished panel 10, the preferred laminate is made without the use of adhesives. Details of a preferred method of making the SMS Laminate are disclosed in U.S. Pat. No. 4,041,203, previously incorporated by reference.

Other properties of SMS Laminate that are desirable in the edge facing 30 is that it readily bonds to adhesives and the third ply 34 that is visible on the finished panel is aesthetically pleasing. The addition of pigment or dye to the preferred thermoplastic polymer allows it to be made in virtually any color. Further, the surface of the third ply 34 accepts printing in the form of a pleasing design or words, such as those that would be used to describe the panel 10 to which it is attached. Where the third ply 34 is a spunbond lamina, the fibers 31 embed themselves in adhesives, providing a secure bond to ceramic tile or any other decorative covering that is applied to the panel 10.

The building panel 10 is made by any known method. The edge facing 30 is preferably supplied as a tape in large rolls and is laid down on a moving surface of a forming table in a direction that is substantially parallel to the direction of the movement of the moving surface. Preferably, the edge facing 30 has a width of from 1" (2.5 cm) to about 6" (15 cm), but any width may be used. Width selection is based upon the thickness of the panel and the amount of overlap desired on the major faces 12. If only one side of the edge facing 30 is water-permeable, the edge facing is oriented so that the first ply 32 is adjacent to the core 16 slurry when it is poured.

The first reinforcing material 26 for at least one of the major faces 12 is unwound from a roll and positioned on the moving surface with the length of the material being parallel to the direction of movement of the moving surface. Preferably the width of the first reinforcing material 26 is approximately the same as the width of the finished panel 10. When placed on the moving surface, at least a bottom overlap portion 40 of the width of the edge facing 30 overlaps a portion of the first reinforcing material 26. Preferably, between about 10% and about 50% of the width of the edge facing 30 overlaps with the first reinforcing material 26.

Meanwhile, the hydraulic material is preferably combined with dry additives, then combined with the wet ingredients to form the slurry. A preferred method of making the building panel 10 includes forming the slurry in a continuous mixer (not shown) to combine all ingredients. For efficiency in manufacturing, the outlet of the mixer is positioned near the moving surface containing the first reinforcing material 26. As the first reinforcing material 26 and edge facing 30 pass near the mixer outlet, the slurry is discharged in a continuous fashion onto the moving first reinforcing material. The slurry is distributed in any suitable manner, such as by use of a screed bar which limits the thickness of the slurry and distributes excess slurry to areas with less slurry. When distributed, the slurry preferably extends to the longitudinal edge of the first reinforcing material 26, but does not extend significantly beyond it. As the slurry comes in contact with the bottom overlapping portion 40 of the edge facing 30, the first ply 32 facing the core 16 slurry absorbs the slurry, thus establishing a good bond between the edge facing and the core.

After the slurry is formed into the panel, an optional second reinforcing material 42 is unrolled and applied to the top face 20. Preferably the second reinforcing material 42 extends to the edge of the longitudinal face 14, covering the top face 20. The portion of the edge facing 30 that extends beyond the first reinforcing material 26 is folded toward the longitudinal edge face 14 of the panel 10. Sufficient pressure is applied to the edge facing 30 material along the longitudinal edge face 14 to embed at least a major portion of the fibers 31 of the first ply 32 into the core 16 slurry to bond the edge facing to the longitudinal edge face. In the alternative, the edge facing 30 is optionally folded prior to application of the core 16 slurry, allowing the slurry to form the longitudinal edge face 14 as it is pressed against the edge facing during panel 10 formation. The order of steps is unimportant as long as the slurry contacts all portions of the edge facing 30 before the slurry sets and will no longer penetrate the fibers 31 of the first ply 32.

Preferably the top overlap portion 44 of the edge facing 30 extends beyond the top of the longitudinal edge 14 and onto the top face 20 after the longitudinal edge is covered. The top overlap portion 44 is what remains of the width of the edge facing 30 after the bottom face overlap 40 and the longitudinal edge 14 portion are applied to their respective surfaces. The top overlap portion 44 is folded over the top face 20 and pressed to the surface to embed fibers 31 of the first ply 32 into the surface. There is no need for the top overlap portion 44 and the bottom overlap portion 40 to be identical in length. The top overlap portion 44 and the bottom overlap portion 40 are designed to provide additional width to the edge facing 30 beyond the height of the longitudinal edge face 14 so that if it is not accurately placed, there is sufficient edge facing material to cover the longitudinal edge face 14, maintaining the aesthetically pleasing look and feel of the panel 10.

Preferably both longitudinal edges are treated with the edge facing 30 as herein described. Steps used to apply the edge facing 30 to one side of the panel 10 are mirrored to apply the edge facing to the opposite longitudinal face 14.

While several particular embodiments of building materials with aesthetic edges have been shown and described, it will be appreciated by those skilled in the art that changes and modifications may be made thereto without departing from the invention in its broader aspects and as set forth in the following claims.

What is claimed is:

1. A building composite panel including at least one longitudinal edge face, comprising:
   a core of hydraulic material having a top major face and a bottom major face, each major face adjoining the longitudinal edge face;
   a slurry-permeable reinforcing material attached to one or more of said major faces; and,
   a multi-ply edge facing material, that is different from said reinforcing material, covering and attached without adhesives to said at least one longitudinal edge face and attached to only a portion of each of said major faces, said edge facing material overlapping said reinforcing material and said top major face and said bottom major face, and comprising at least a slurry-permeable first ply embedded in said longitudinal edge face and a second, slurry-impermeable ply bonded to said first ply, wherein between about 10% and about 50% of the width of the edge facing overlaps with the first reinforcing material.

2. The panel of claim 1 further comprising a third ply bonded to said second ply opposite to and made of the same material as said first ply.

3. The panel of claim 1 wherein said first ply comprises at least one spunbond lamina.

4. The panel of claim 1 wherein said second ply comprises a meltblown lamina.

5. The panel of claim 1 wherein said edge facing material comprises at least one of polypropylene, polyethylene, nylon, polyester and copolymers thereof.

6. The panel of claim 1 wherein said plies of said edge facing material are bound together without the use of adhesives.

7. The panel of claim 1 further comprising a third ply bonded to said second ply, wherein said third ply readily bonds to adhesives.

8. The panel of claim 1 wherein said hydraulic material comprises calcium sulfate hemihydrate.

9. The panel of claim 1 wherein a portion of said first reinforcing material is embedded in said core between said core and said edge facing material.

10. A building composite panel including at least one longitudinal edge face, comprising:
    a core of hydraulic material having a top major face and a bottom major face, each adjoining the longitudinal edge face,
    a slurry-permeable reinforcing material attached to one or more of said major faces; and,
    a multi-ply edge facing material, which is different from said reinforcing material, attached without adhesives to the at least one longitudinal edge face and to only a portion of each adjoining major face, said edge facing material overlapping said reinforcing material on both major faces and comprising a slurry-permeable first ply comprising a spunbond lamina embedded in the core; a second, slurry-impermeable ply comprising a meltblown lamina and bonded to said first ply; and a third slurry-permeable ply comprising a second spunbond lamina, wherein between 10% and about 50% of the width of the edge facing overlaps with the first reinforcing material.

11. The panel of claim 10 wherein said second spunbond lamina is made of the same material as said first spunbond lamina.

12. The panel of claim 10 wherein said second spunbond lamina is made of a different material from said first spunbond lamina.

13. The panel of claim 10 wherein said first and third plies are bonded to said second ply without the use of adhesives.

14. The panel of claim 10 wherein each of said plies comprises at least one of polypropylene, polyethylene, nylon, polyester and copolymers thereof.

15. The panel of claim 10 wherein said edge facing material further comprises a dye.

16. The panel of claim 10 wherein said hydraulic material comprises calcium sulfate hemihydrate.

17. The panel of claim 10 wherein a portion of said first reinforcing material is embedded in said core between said core and said edge facing material.

* * * * *